United States Patent [19]  
Chelminski

[11] Patent Number: 4,798,261  
[45] Date of Patent: Jan. 17, 1989

[54] SMALL POWERFUL HYDRO GUN

[75] Inventor: Paul Chelminski, Norwalk, Conn.

[73] Assignee: Bolt Technology Corporation, Norwalk, Conn.

[21] Appl. No.: 881,911

[22] Filed: Jul. 3, 1986

[51] Int. Cl.[4] ............................................... G01V 1/38
[52] U.S. Cl. ..................................... 181/120; 367/144
[58] Field of Search ............................... 181/116-120, 181/402, 115; 367/144, 146

[56] References Cited

U.S. PATENT DOCUMENTS

| 4,185,714 | 1/1980 | Pascouet et al. | 181/120 |
| 4,234,052 | 11/1980 | Chelminski | 181/120 |
| 4,240,518 | 12/1980 | Chelminski | 181/107 |

FOREIGN PATENT DOCUMENTS

| 152099 | 8/1985 | European Pat. Off. | 367/144 |
| 325 | 6/1979 | PCT Int'l Appl. | 181/120 |

OTHER PUBLICATIONS

Renard et al., Simplon Water Gun, A New Implosion Type Seismic Source, Offshore Technology Conference, 6200 North Central Express in Dallas, TX, 1974, pp. 773-776.
P. Newman, "Water Gun Fills Marine Seismic Gap", Oil and Gas Journal, Aug. 7, 1978.

Primary Examiner—Brian S. Steinberger  
Attorney, Agent, or Firm—Parmelee, Bollinger & Bramblett

[57] ABSTRACT

An uncomplicated, easy to operate, relatively inexpensive, compact and powerful acoustical source hydro gun for use in a liquid environment is particularly effective in a multiple array for marine life management. The powerful output, compactness and non-complex features of this hydro gun enable its advantageous use as a seismic energy source for high resolution marine seismic exploration and for seismic exploration when lowered down into a well in the earth containing liquid. A cylinder containing a free-moving piston has water discharge ports near one end for admitting water when the hydro gun is immersed in water and for discharging water when the hydro gun is activated by a solenoid valve. The solenoid valve is mounted on a cylinder head block containing a small annular high pressure firing chamber charged with pressurized gas and closed by the solenoid valve. To fire this hydro gun, the solenoid valve is electrically energized, thereby opening a short flow path from the firing chamber into the head end of the cylinder. The sudden discharge of high pressure gas into the cylinder head end propels the water piston along the cylinder for suddenly discharging water through the discharge ports. The water piston blocks these ports thereby creating a cavity in the ambient liquid which collapses to produce a wideband frequency sharply-peaked pressure impulse rich in frequencies above 300 Hz. Hydrostatic pressure automatically returns the piston to its initial position at the cylinder head end.

14 Claims, 2 Drawing Sheets

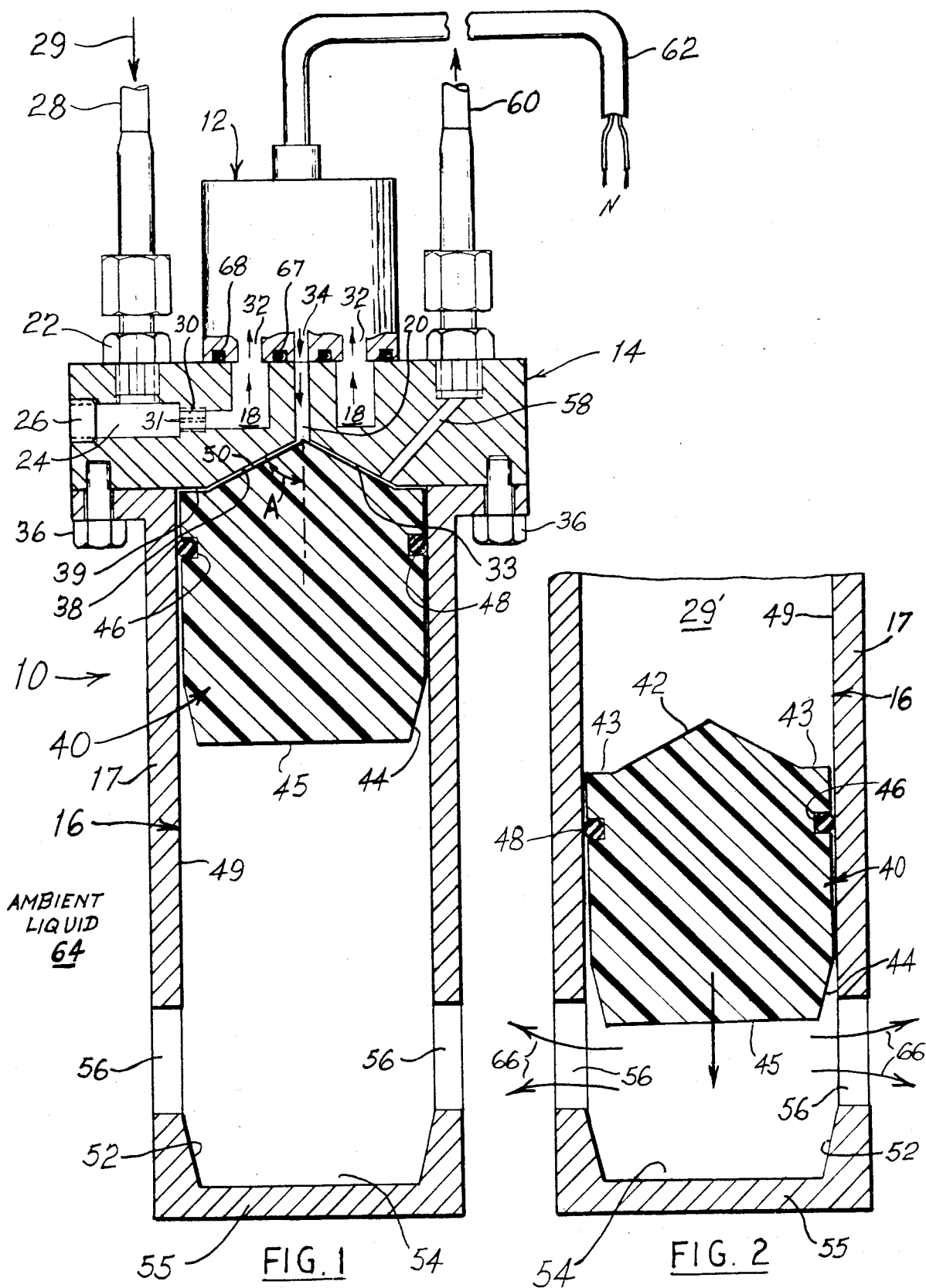

SMALL POWERFUL HYDRO GUN

BACKGROUND

This invention relates to acoustical sources for use in a liquid environment and more particularly to such sources, called hydro guns, in which slugs of water are propelled into the surrounding water by a piston under the influence of an expanding volume of high pressure pressurized gas, and these slugs of water create cavities which collapse under hydrostatic pressure for creating sharply peaked pressure impulses.

The present invention in one of its applications is advantageous for use in marine life management to prevent marine animals from occupying specific locations where their presence is undesirable. One such application is the diversion of marine animals for example, fish, turtles, manatees and the like away from cooling water intake structures associated with steam generating plants, either fossil fuel or nuclear fuel. Fish are commonly either impinged and trapped on protective nets or screens or are carried into intake systems. In either case, large fish mortality can result with substantial costs being incurred by utilities.

As mentioned above, screens, nets or other types of continuous barriers do not provide a solution to the problem of animal intrusion into cooling water intake structures because of the likelihood of their impingement and trapping as well as the problem of clogging by debris, and the possibility of damage to the barriers caused by ice, logs or boats. In attempting to provide a solution to the above problem in marine life management, lights and sound generators submerged in water have been used to create a field of radiation attempting diversion of marine life from a protected area. Lights often attract rather than repelling marine life, and unattended submerged lights rapidly deteriorate, burn out, break or short circuit.

Among under water sound generators, the seismic airgun is convenient to use and produces high amplitude acoustical radiation. This acoustical energy is mainly generated by airguns at low frequencies (5 to about 200 Hz) and thus produces relatively long acoustical wavelengths. It has been observed that some fish, particularly small fish, will swim quite close to these airguns during operation. It is suggested that the long wave length (acoustical) sound waves produced by these devices do not stimulate an adequate aversion response in small fishes. I believe that acoustical impulses having a steeper wave front, in other words, a higher frequency content than those generated by an airgun would be more effective in modifying small fish behavior. It is also believed that the turbulence and water aeration associated with airgun impulses may act as an attractant to some species of marine life.

SUMMARY OF THE DISCLOSURE

The present invention in one of its aspects is directed to the solution of this marine life management problem by providing a device which produces an underwater acoustical impulse having a steeply rising pressure wave front followed by an abrupt pressure drop. This impulse is characterized by a wide-bandwidth frequency spectrum rich in frequencies higher than 300 Hz. The acoustical impulse is generated by causing a cavity to be formed in the water, the collapse of which produces the desired sharply peaked pressure impulse. Although a number of cavity producing devices have been developed for seismic prospecting at sea, the existing marine seismic surveying devices are generally large and heavy and for generating massive sound impulses which are capable of travelling to great depths in the seabed and requiring large amounts of pressurized gas. Such existing marine seismic surveying devices are normally towed behind a survey vessel at sea and are operated under continuous monitoring and are not designed to be operated in fixed locations unattended for long periods of time in areas of difficult access. Furthermore, in the present application of marine life management, the requirement for a large number of unattended, submerged acoustic source dispersed over and covering wide areas make the use of conventional airguns and water guns uneconomic. The reliable long operating life characteristics of the present hydro guns make them well suited for marine life management.

Quite apart from the marine life management field, there are applications in the field of seismic energy geophysical investigation and exploration where the powerful, compact, noncomplex hydro guns embodying the present invention will prove to be advantageous. Their sharply peaked pressure impulse output produces acoustical waves having a relatively wide-band-width frequency spectrum rich in frequencies higher than 300 Hz, and therefore these small, powerful hydro guns will be well suited for use in high resolution marine seismic investigation and exploration, particularly where numerous such hydro guns are used in an array. The small compact configuration of the hydro guns and their efficient utilization of relatively small volumes of compressed air will enable large numbers of such hydro guns to be employed in long streamer arrays towed behind marine seismic survey vessels without undue drag forces and without undue consumption of compressed air even when fired at relatively rapid repetition rates.

For another advantageous application, the compact structure and relatively powerful output of hydro guns embodying the present invention render them very desirable for lowering into wells in the earth containing liquid for seismic energy investigations of the geophysical structures near the well bore. Hydro guns embodying the invention do not release blasts of air into the liquid in the well bore and thus do no aerate the liquid in the well bore with clusters of bubbles which reduce the average density of the liquid in the well bore and thus reduce the hydrostatic pressure at depths in the well. Moreover, the wide-band-width frequency spectrum having considerable acoustical energy content above 300 Hz advantageously provides high resolution data about geophysical structures near the well.

Accordingly, it is an object of the present invention to provide a small powerful hydro gun for use in marine life management which provides the solution to the problems discussed above in connection with marine life management.

Another object of this invention is to provide a new small powerful hydro gun for underwater use which is distinguished by its simplicity of design providing a low cost unit with high operational reliability.

A further object of this invention is to provide a new small powerful hydro gun having reliable and long operating life and thus which may be operated unattended for long periods of time in areas of difficult access.

Still a further object of this invention is to provide a new small powerful hydro gun which may easily be dispersed in large numbers to provide diversion and control of marine life to keep marine creatures away from protected areas reliably and at a reasonable cost.

Another object of this invention is to provide a new underwater acoustic impulse generating device which produces an acoustic impulse of desired frequency characteristics without utilizing large volumes of compressed air and which is advantageous for use in arrays for high resolution marine seismic exploration.

Among the advantages of hydro guns embodying the present invention are those resulting from the fact that they are compact, reliable and relatively powerful in comparison with their small size and provide a wide frequency spectrum rich in frequencies above 300 Hz making them excellently adapted to be lowered into wells in the earth containing liquid and then for firing in the wells for seismic energy investigations of geophysical structures in the earth surrounding the well.

In carrying out this invention in one illustrative embodiment thereof, a small powerful hydro gun is provided generating an acoustical impulse having a steeply rising pressure wave front followed by an abrupt pressure drop which impulse is characterized by a wide frequency spectrum rich in frequencies above 300 Hz. The hydro gun has a cylinder with discharge port means near a first end portion thereof (the lower end portion) for admitting water when the hydro gun is immersed in water and for discharging water through the port means when the hydro gun is fired. A free moving water piston is mounted in this cylinder. A solenoid valve for firing the hydro gun is mounted on a chamber block covering the second end (the head end) of this cylinder. This block contains an annular high pressure gas chamber which is the firing chamber, and there is a short discharge passage from this firing chamber through the solenoid valve to the head end of the cylinder. A source of high pressure gas is provided for charging the annular firing chamber. An electrical firing cable is provided for actuating the solenoid valve for abruptly releasing high pressure gas from the firing chamber through the discharge passage in the chamber block into the head end of the cylinder for propelling the water piston along the length of the cylinder thereby discharging water from the cylinder through the discharge port means. The movement of the water piston in the cylinder abruptly cuts off the discharge of water for causing the discharged water to create a cavity which collapses by hydrostatic pressure to produce a sharply peaked acoustical pressure impulse having a wide frequency spectrum rich in frequencies above 300 Hz.

The free moving water piston may be of one-piece construction with an O-ring or piston ring seal mounted in a groove serving as a sliding seal with the cylinder wall surface like a piston ring.

BRIEF DESCRIPTION OF THE DRAWINGS

The invention, together with further aspects, objects, features and advantages thereof will be more clearly understood from a consideration of the following description taken in connection with the accompanying drawings which are arranged for clarity of illustration and not necessarily to scale, and in which like reference numerals are used to refer to corresponding elements throughout the various views.

FIG. 1 is a side elevational view, primarily shown in section, illustrating a small powerful hydro gun embodying the present invention.

FIG. 2 is a partial elevational sectional view showing the piston of the hydro gun of FIG. 1 moving down in its cylinder for expelling water therefrom through the discharge ports located near the lower end of the cylinder.

DETAILED DESCRIPTION OF THE PREFERRED EMBODIMENTS

Figure 3:
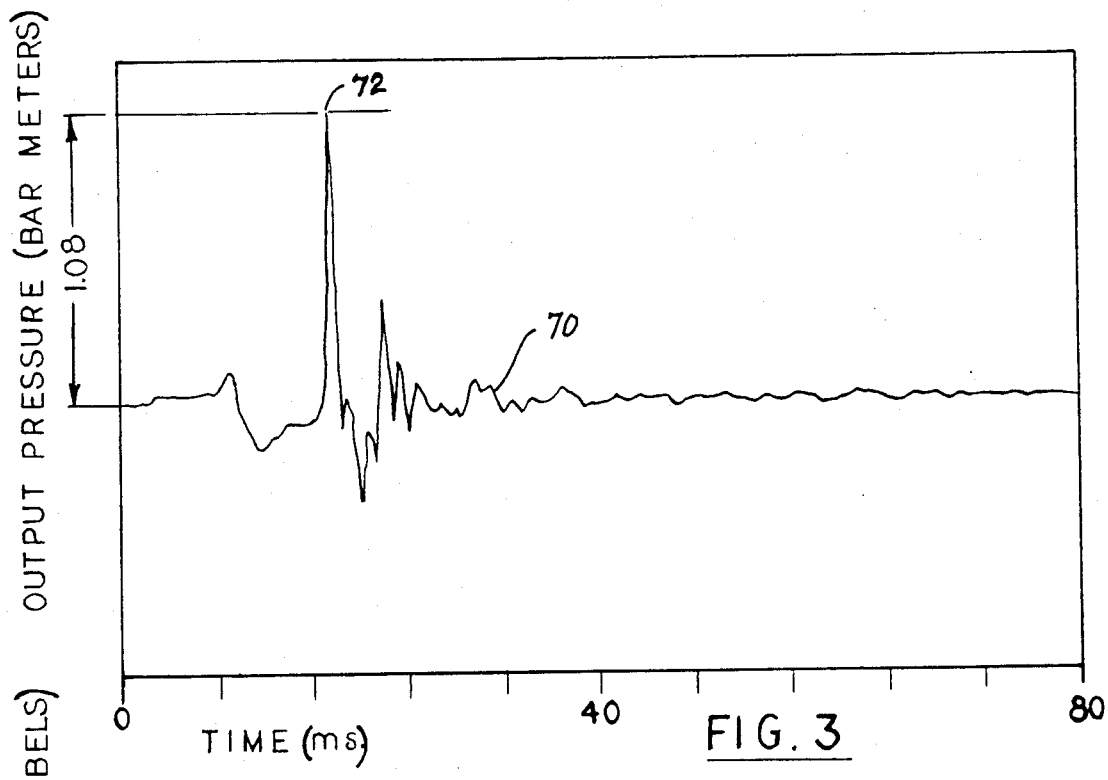
FIG. 3 is a graph of output pressure in bar meters plotted vs time for the small powerful hydro gun of FIGS. 1 and 2.

As used in this description, a "hydro gun" is an underwater acoustical energy, i.e., sound, generating device. The dominant acoustical energy generating mechanism is an implosion resulting from the collapse of cavities created in the ambient liquid, usually water. In a hydro gun these cavities are created by initiating high velocity water flow which is abruptly terminated.

This invention provides a hydro gun which is significantly less complex than existing devices. The illustrative embodiment of the present invention as shown in FIGS. 1 and 2 is most appropriate for relatively small volume water discharge.

In the present hydro gun 10 (FIG. 1) the compressed gas discharge from a large-orifice, quick-opening, solenoid-actuated valve 12 plus a small nearby annular firing chamber 18 is used to propel a lightweight water piston 40, preferably of rigid plastic, within a water-filled cylinder 16. The rapid motion of the water piston ejects high velocity slugs of water from discharge ports 56 located in the far end (the lower end) of the cylinder. At the end of the cylinder, the water piston suddenly cuts off the high velocity water flow, thereby causing caviation to occur in the ambient liquid in the vicinity of the discharge ports. The implosion of these cavities by hydrostatic pressure in the ambient liquid produces the desired acoustical signal.

As used herein, the term "pressurized gas" is intended to include any pressurized gas or pressurized mixture of gases which can be used as the gaseous propulsion medium for the water piston and which can be controlled by a quick-opening solenoid-actuated valve, for example, such as compressed air, compressed carbon dioxide, compressed nitrogen, pressurized gaseous products of combustion, steam, and the like. In most cases, it is easier and cheaper to use compressed air, supplied from a mobile compressor or from portable tanks, and air is usually the preferred pressurized gas to be employed. However, in certain cases, for example, if the environment is suspected to contain combustible vapors or flammable gas or agents unduly reactive with the air, then it may be desirable to use non-combustion-supporting gas, such as carbon dioxide, or nitrogen. Also, "pressurized" is intended to mean at an elevated pressure substantially above atmospheric pressure for example, such as the preferred range of 500 pounds per square inch (psi) up to 6,000 psi, although higher or lower pressures of the pressurized gas can occasionally be used. In the example plots presented with this specification to illustrate the advantages of the present invention, pressurized air at 3,000 pounds per square inch was used.

The hydro gun in accordance with a preferred embodiment of the present inventon is illustrated in FIGS. 1 and 2 and is referred to generally by the reference numeral 10. The hydro gun 10 includes the solenoid-actuated valve 12, usually called a solenoid valve, similar to that which is shown and described in U.S. Pat. No. 4,240,518 which is incorporated herein by reference, and is characterized by having a large-orifice quick-opening valve assembly. This solenoid valve 12 is mounted on a chamber block 14 interposed between the solenoid valve 12 and the water-filled cylinder 16. The chamber block 14 includes a small annular firing chamber 18 surrounding a solenoid valve discharge passage 20. The block 14 has a pressurized gas supply hose inlet fitting 22 in communication with a pressurized gas supply inlet 24 which is closed at one end by a plug 26. A high pressure gas supply hose line 28 is attached to the inlet fitting 22 for supplying the hydro gun 10 with pressurized gas as shown by arrow 29 at the desired pressure level, for example 3,000 p.s.i. A gasflow-restricting orifice element 30 feeds from the inlet passage 24 into the annular firing chamber 18.

The purpose of this flow-restricting orifice element 30 with its narrow passage 31, is to provide effective isolation of the annular firing chamber 18 from the inlet 24 and from the supply hose line 28, so that during each brief time period when the solenoid valve 12 is actuated, only an insignificant amount of pressurized gas is able to flow from the inlet 24 through the solenoid valve 12 into the cylinder 16. Thus, this flow-restricting orifice 31 conserves pressurized gas by preventing unwanted flow from the inlet 24 through the valve whenever the solenoid valve is actuated. On the other hand, the small-diameter passage 31 through this orifice element 30 is sufficiently large for enabling the annular firing chamber to be completely recharged with pressurized gas to its operating pressure level during the time intervals between successive actuations of the solenoid valve 12.

This solenoid valve 12 is actuated by briefly energizing its winding, as shown in the '518 patent referred to above, with an electrical pulse for suddenly opening the valve assembly for providing a short-length and relatively large size flow path leading from valve inlet ports 32 to a valve outlet or discharge port 34. The small annular firing chamber 18 is intentionally located as close as possible to the valve inlet ports 32 for advantageously providing the shortest possible flow path for the pressurized gas in suddenly discharging from this firing chamber 18 through the valve 12 into the head end 33 of the water-filled cylinder 16 within the side wall 17. The purpose of providing this very short and relatively large cross sectional area flow path from the annular firing chamber 18 into the head end 33 of the water cylinder 16 is to maximize the power and intensity of the pressurized gas discharged into the cylinder 16 for maximizing the propulsive power being applied to the water piston 40 by the small volume of discharged pressurized gas. Undesired frictional losses and turbulence gaseous flow losses are thereby minimized for achieving a surprisingly powerful acoustical energy output from such a small hydro gun 10.

The solenoid valve 12 has its inlet ports 32 communicating directly with the annular firing chamber 18 and has its outlet port 34 directly in communication with the solenoid discharge passage 20 in the center of the chamber block 14 which leads directly into the center of the head end 33 of the water cylinder 16.

As described above, the gas-flow-restricting orifice passage 31 restricts the flow of high pressure pressurized gas from the supply line 28 via the hose inlet fitting 22 so that when the solenoid valve 12 is actuated essentially only that volume of pressurized gas previously stored within the annular firing chamber 18 is discharged through the solenoid valve discharge passage 20 for propelling the water piston 40.

The water cylinder 16 is secured to the chamber block 14 by machine screws 36. The water cylinder 16 houses the freely movable water piston 40 having a conically shaped head projection 42 (FIG. 2) and a tapered lower end portion 44. This concentrically located upwardly extending symmetrical projection 42 occupies more than 50% of the total cross sectional area of the head of the water piston 40. For example, this water piston is about 2 inchs in diameter, and the base of this conical projection 42 contiguous with an annular flat piston head surface 43 is about 1 and ½ inches, thereby forming the annular flat piston head surface 43 about ¼ of an inch wide in radial extent. The water piston 40 has an encircling annular groove 46 which carries a piston seal 48 comprising an O-ring or a piston ring. The piston seal 48 provides a sliding seal with the cylinder wall surface 49.

The upper or head end 33 of the water cylinder 16 is closed by the chamber block 14. At the head end of the cylinder, the block 14 has a concentrically located conical cavity 38 joined at its apex with the solenoid valve discharge passage 20. When the piston 40 is in its initial pre-firing position shown in FIG. 1, the piston head 42, 43 has a complementary conical 42 and annular shoulder configuration 43 mating to the conical cavity 38 and flat surface 39 of the block 14. Thus, there is formed a conically shaped downwardly diverging channel 50 between the cylinder head 38, 39 and the piston head 42, 43 when the water piston 40 is in its initial position. This downwardly diverging channel 50 has an angle A of about 60° to the axis of the cylinder 16 and suddenly applies pressurized gas fed through the solenoid valve discharge passage 20 into channel 50 to apply that pressurized gas with minimum energy losses and minimum momentum losses against the conical and annular shoulder shaped piston head 42, 43. The cylinder 16 is terminated at its lower end with a converging tapered wall surface 52 forming a dashpot region 54 having a complementary configuration to the tapered lower end 44 of the water piston 40.

The water cylinder 16 is provided with a plurality of water discharge ports 56 in the side wall 17 of the cylinder 16 located immediately above the converging dashpot surface 52. A vent air passage 58 is provided in the cylinder block 14 in communication with the conical channel 50 and which passage is coupled to a vent air hose 60. The vent air passage 58 has a diameter of about ⅛ of an inch. The vent hose 60 extends upwardly above the surface of the ambient liquid 64, which is usually water. When this hydro gun 10 is lowered into a well in the earth, the ambient liquid often will be water whose density has been effectively considerably increased by the addition of drilling mud as is well known in the oil well or gas well drilling industry.

In operation when this hydro gun 10 is submerged in liquid 64, the liquid enters the cylinder 16 through the water discharge ports 56. Thus, ambient hydrostatic pressure is applied to the lower tapered end 44 of the piston 40. Since the piston head 42 is at atmospheric pressure due to the vent air hose 60 and the vent air passage 58 communicating with the atmosphere above the ambient liquid surface, an unbalanced force exists on the water piston 40 which moves the piston upwardly until its annular head surface 43 comes to rest against the flat cylinder head surface 39 of the channel block 14. The water piston 40 is thus raised within the water cylinder 16 to its initial position as illustrated in FIG. 1. This piston is thereby automatically placed in a position which is considered its initial position awaiting the actuation of the solenoid valve 12 in the firing of the hydro gun 10.

Pressurized gas 29 is introduced into the firing chamber 18 through the high pressure gas supply line 28 into the high pressure gas inlet 24 and through the flow-restricting orifice 31 into the annular firing chamber 18. When the solenoid valve 12 is electrically energized through an electrical firing cable 62, pressurized gas is discharged from the firing chamber 18 through the air discharge passage 20 into the conical channel 50 surrounding the projecting head 42 of the piston 40. The suddenly released pressurized gas impinges against the piston head 42, 43 thereby suddenly driving the piston toward the lower end 54 of the water cylinder 16. Ambient liquid 64, for example water, seawater, or water with admixed drilling mud, which has filled the cylinder 16, is expelled at high velocity as shown in arrows 66 in FIG. 2 through the water discharge ports 56 into the ambient liquid 64.

When the lower end surface 45 of the piston 40 reaches and passes discharge ports 56, the expelled high velocity water flow 66 is abruptly cut off thereby creating cavitation in the ambient liquid 64. The collapse of these cavities by hydrostatic pressure produces the desired sharply peaked pressure signature, for example, which is illustrated in FIG. 3.

As the lower end surface 45 of the piston 40 proceeds past the water discharge ports 56 as will be understood more clearly from FIG. 2, the piston taper 44 enters the dashpot region 54 of the water cylinder 16. The resulting dashpot effect of water trapped below the piston surface 45 and between the sloping surfaces 44 and 52 slows and damps the piston travel so as to prevent the piston 40 from undue impact against the lower end wall 55 of the cylinder 16.

The piston seal 48 is located sufficiently high on the water piston 40 so as not to reach the water discharge ports 56 and thus advantageously prevents the discharge of gas into the ambient liquid. Consequently, this seal 48 also prevents the entry of water into the cylinder 16 above the piston 40.

The firing cycle is completed when the expanded pressurized gas 29 (FIG. 2) in the cylinder 16 above the piston 40 is vented to the atmosphere above the surface of the ambient liquid 64 via vent hose 60. The piston 40 is then returned by hydrostatic pressure to its initial position (FIG. 1) abutting the head surface 39.

It is my brother, Stephen V. Chelminski, who invented the method and system of employing hydrostatic pressure of ambient water for automatically returning a water piston to its initial position in a water cylinder of a hydro gun as is disclosed and claimed in copending U.S. application Ser. Nos. 680,733 and 762,966, now U.S. Pat. No. 4,712,202, issued Dec. 8, 1987, which are incorporated herein by reference, however, there are important differences between his inventions and the hydro gun embodying the present invention. He arranged for ambient water to by-pass the water piston after the water piston has been returned, and this by-passed water enters and fills the head end of his water cylinder and then enters and fills up the vent hose extending up to the surface. Quite to the contrary, in the hydro gun 10 embodying the present invention, the ambient liquid 64 is prevented by the seal 48 from bypassing the water piston 40. Ambient liquid 64 does not enter the head end of the cylinder 16 above the piston 40 and does not enter the vent passage 58 nor the vent hose 60. It is to be understood that the hydro guns invented by my brother are considerably more powerful than the present hydro gun 10. On the other hand, by virtue of the fact that ambient liquid does not enter and fill the vent hose line 60, considerable time is saved, and thus the present compact and non-complex hydro gun 10 provides a considerably more rapid repetition firing rate, for example as often as twice per second when operated at a depth of about 10 meters in the ocean. Moreover, in comparison with its size, the present hydro gun generates a surprisingly powerful acoustical energy signature as shown in FIGS. 3 and 4.

The hydro gun 10 can be employed in any orientation relative to the earth's gravitational field, thus, "upper" and "lower" terms are used for convenience of explanation in reference to the drawing but are not intended to be limiting.

Figure 4:
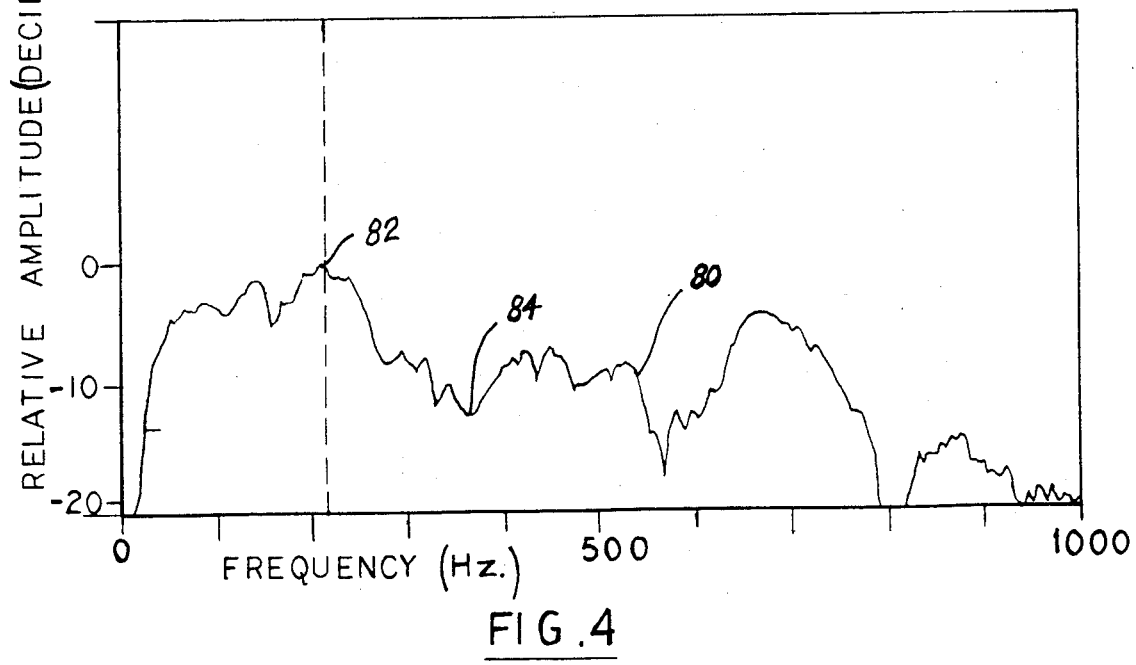
FIG. 4 is a graph of relative amplitude in decibels plotted vs frequency for this hydro gun.

The preferred pressurized gas 29 operating pressure for the hydro gun 10 is approximately 3,000 pounds per square inch which preferred operating pressure is utilized in the hydro gun signature plots shown in FIGS. 3 and 4. The hydro gun 10 has an annular firing chamber 18 with a firing volume of 0.77 cubic inches to which is added the very small volume of pressurized gas in the inlet ports 32 and passages of the solenoid valve itself prior to firing, thus making an overall pressurized gas charge of about 0.85 to 0.90 cu. in. Using a pressurized gas 29 (FIG. 1) of 3,000 p.s.i. and with the hydro gun 10 located at a depth of 2 meters in Long Island Sound produced the output pressure vs time plot 70 shown in FIG. 3 and the relative amplitude vs frequency plot 80 as shown in FIG. 4. FIG. 3 shows the acoustical pressure wave form 70 generated by the hydro gun 10 plotted as a function of time in milliseconds showing that a sharply peaked pressure impulse occurs within 20 milliseconds after actuation of the solenoid valve and having a peak pressure 72 of 220.7 db for a reference of 1 microPascal at 1 meter. It is noted that one Pascal equals a pressure of one Newton per square meter which equals ten dynes per square centimeter which equals about ten microBars. One Bar equals one atmosphere which equals $1.013 \times 10^5$ Pascals. Another way of expressing the peak pressure 72 in FIG. 3 is 1.08 Bar-meters. The plot 80 in FIG. 4 illustrates the broad frequency spectrum generated by acoustical pressure waveform 70 shown in FIG. 3 which is rich in the frequencies above 300 Hz, a desired characteristic for the hydro gun 10 of this invention. The "ghost notch" 84 occurring at about 375 Hz in FIG. 4 results from the reversed phase reflection from the surface of the body of water in which the hydro gun 10 was located at a depth of 2 meters. An airgun having a firing chamber volume of 10 cubic inches and a pressure of 3,000 p.s.i. operated at a depth of 2 meters produces a peak output pressure of about 206.6 db with a reference of 1 microPascal at 1 meter, which is a peak pressure of 0.212 Bar-meters. The highest relative amplitude for the frequency spectrum of the hydro gun occurs at 230 Hz as contrasted with the highest relative amplitude occurring at 50 Hz for the airgun. Thus, the hydro gun 10, while consuming about one tenth as much compressed air generates a peak pressure almost five times larger, and the highest relative amplitude in the hydro gun's frequency spectrum occurs at 230 Hz compared with 50 Hz for the airgun.

The underwater sound impulse generating hydro gun of the present invention may be utilized in multiple element arrays to keep fish and other marine life away from problem areas such as generating plant cooling water intake structures. Normally these devices would be located at substantial distances from land and in relatively inaccessible underwater areas. The simplicity and maintenance free nature of the hydro gun of the present invention is thus suitable for installation in these remote, unattended types of areas. With an array of such hydro guns, sharply peaked acoustical impulses may be generated in changing random patterns to eliminate the possibility of fish becoming accustomed to a set pattern of sound impulses. The firing patterns can be controlled for each hydro gun in an array from a on-shore installation. The individual hydro guns can be controlled by a digital code from an onshore based computer to an offshore decoder and firing control, for example similar to what is shown in the copending application of Augustus W. Fiske, Ser. No. 475,457 incorporated herein by reference. Ond hundred or more such hydro guns may be conveniently controlled in this manner with only a single 2 or 4 conductor cable being strung between the onshore and offshore installations. Similarly, because of relatively low compressed air consumption, only a single hose is necessary for providing the pressurized gas to connect the onshore station with an offshore installation.

According, an extremely easy to operate and easy to to maintain reliable and long operating life hydro gun is provided for producing a steeply rising pressure wave front which has a wide frequency spectrum rich in frequencies above 300 Hz. The hydro gun 10 requires only a modest amount of pressurized gas in operation. Additionally, the operation of the hydro gun does not require the discharge of compressed gas into the ambient liquid 64 which discharge might act as an attractant to some species of marine life. This avoidance of gas discharge plus its compact size and relatively powerful, relatively high frequency output makes this hydro gun extremely adapted for firing in drilling mud in well bores where aeration of the drilling mud is not desired because such aeration would reduce the density of the drilling mud thereby undesirably reducing the hydrostatic pressure at the bottom of the well.

In one illustrative presently preferred embodiment of the hydro gun 10, the water cylinder 16 has an inside diameter (I.D.) of about 2 inches, and an overall length of 5.75 inches from the cylinder head surface 39 to the inner surface of the lower end wall 55. The free-moving water piston 40 is light in weight and is made of rigid, tough, durable polyurethane and has an outside diameter (O.D.) slightly less than the I.D. of the cylinder 16. The overall length of the piston 40 from the tip of its conical projection 42 to its lower surface 45 is about 2.5 inches. The piston seal 48 is shown as an O-ring, which may be of polyurethane or Viton flurocarbon elastomer. A piston ring of rectangular cross section may be used in lieu of the O-ring sliding seal 48. Thus, the weight of the piston 40 is less than the weight of a volume of water equal to the piston volume. An O-ring seal 67 seals the joint between outlet port 34 and discharge passage 20. Another O-ring 68 seals the joint between firing chamber 18 and the inlet ports 32 which are at least four in number and are located at equally spaced intervals around the outlet port 34.

Since other changes and modifications varied to fit particular operating requirements and environments will become apparent to those skilled in the art, the invention is not considered limited to the examples chosen for purposes of illustration, and includes all changes and modifications which do not constitute a departure from the true spirit and scope of this invention as claimed in the following claims and reasonable equivalents thereto.

What is claimed is:

1. An impulse generating hydro gun for generating an acoustical energy impulse in liquid having a steeply rising pressure followed by an abrupt pressure drop comprising:

a cylinder wall having first and second ends with discharge port means in said cylinder wall near the second end for admitting liquid into a cylinder within said cylinder wall when said hydro gun is submerged in liquid and for discharging liquid from said cylinder through said discharge port means when said hydro gun is fired, a piston mounted for free movement in said cylinder, said piston initially being positioned within said cylinder near said first end of said cylinder wall, the region within said cylinder near said first end of said cylinder wall being the head end of the cylinder, a solenoid valve for firing said hydro gun and having at least one inlet port and an outlet port, chamber block means secured to said first end of said cylinder wall and being positioned between the head end of said cylinder and said solenoid valve, said chamber block means having an annular firing chamber therein communicating with said inlet port of said solenoid valve, said chamber block means having a discharge passage in communication between said outlet port of said solenoid valve and said head end of said cylinder, means for charging said annular firing chamber with pressurized gas, means for actuating said solenoid valve for abruptly releasing said pressurized gas from said firing chamber through said discharge passage into the head end of the cylinder for propelling said piston along said cylinder toward the second end of said cylinder wall for thereby discharging liquid from the cylinder through said discharge port means, said piston effectively blocking said discharge port means when said piston nears said second end of the cylinder wall for suddenly interrupting the discharge of liquid through said discharge port means for creating at least one cavity in the surrounding liquid which collapses by hydrostatic pressure for generating said acoustical impulse in liquid, means for slowing and stopping said piston as it nears said second end of the cylinder wall, and said hydro gun having vent means communicating with the head end of the cylinder for connection to a vent line extending to the atmosphere above the liquid surface for venting to the atmosphere the expanded pressurized gas from the cylinder after said piston has been propelled toward the second end of said cylinder wall for enabling the hydrostatic pressure of liquid entering into the cylinder through said discharge port means to return said piston to the initial position at the head end of the cylinder near said chamber block means.

2. The hydro gun as claimed in claim 1, in which:

said piston has a lower end facing away from said head end of said cylinder and has a head end surface facing towards said head end of said cylinder, said head end surface of the piston has a projection occupying at least 50% of the area of said head end surface, said projection is concentric with the axis of said cylinder, said chamber block means has a cavity adjacent to the head end of said cylinder for mating with said projection on the piston when the piston is in the initial position near said chamber block means, said cavity is concentric with the axis of said cylinder, and said discharge passage in said chamber block means is concentric with the axis of said cylinder and communicates with said cavity.

3. The hydro gun as claimed in claim 2 in which:

said projection on said piston is conical having an apex located on the axis of the cylinder;

said cavity in said chamber block means is conical having an apex located on said axis; and said discharge passage extends in said chamber block means in a direction parallel with said axis and said discharge passage communicates directly with said apex of said conical cavity.

4. The hydro gun as claimed in claim 3, in which:

said conical cavity in said chamber block means has a surface sloping at an angle A of about 60° to the axis of said cylinder.

5. The hydro gun as claimed in claim 1, in which:

said discharge passage in said chamber block means extends concentric with the axis of said cylinder and communicates with said head end of said cylinder at the center of said head end at the axis of said cylinder; and said annular firing chamber in said chamber block means encircles said discharge passage and communicates directly with said inlet port of said solenoid valve.

6. The hydro gun as claimed in claim 5, in which:

said means for charging said annular firing chamber with pressurized gas includes a flow-restricting orifice positioned near said annular firing chamber through which pressurized gas flows during charging of said annular firing chamber; and said flow-restricting orifice essentially limits the amount of pressurized gas which is discharged into the head end of said cylinder during firing of said hydro gun to the amount of pressurized gas charged into said annular firing chamber plus of pressurized gas released by the solenoid valve itself during firing.

7. The hydro gun as claimed in claim 1, in which:

said piston has a lower end facing away from said head end of said cylinder and has a head end facing said head end of said cylinder;

said piston carries seal means in sliding sealing relationship with the cylinder wall; and said seal means are located on said piston sufficiently far from said lower end of said piston for preventing said seal means from sliding to said discharge port means for preventing liquid from entering into said cylinder in the region between said head end of said piston and said chamber block means.

8. The hydro gun as claimed in claim 1, in which:

said means for charging said annular firing chamber with pressurized gas includes a flow-restricting orifice positioned near said annular firing chamber through which pressurized gas flows during charging of said annular firing chamber; and said flow-restricting orifice essentially limits the amount of pressurized gas which is discharged into the head end of said cylinder during firing of said hydro gun to the amount of pressurized gas charged into said annular firing chamber plus the small amount of pressurized gas released by the solenoid valve itself during firing.

9. The hydro gun as claimed in claim 2, in which:

said discharge passage in said chamber block means extends concentric with the axis of said cylinder and communicates with said head end of said cylinder at the center of said head end at the axis of said cylinder;

said annular firing chamber in said chamber block means encircles said discharge passage and communicates directly with said inlet port of said solenoid valve for obtaining rapid discharge of said annular firing chamber when said solenoid valve is actuated;

said means for charging said annular firing chamber with pressurized gas includes a flow-restricting orifice positioned near said annular firing chamber through which pressurized gas flows during charging of said annular firing chamber; and said flow-resticting orifice essentially limits the amount of pressurized gas which is discharged into the head end of said cylinder during firing of said hydro gun to the amount of pressurized gas charged into said annular firing chamber plus of pressurized gas released by the solenoid valve itself during firing.

10. A hydro gun adapted to be submerged in liquid for generating acoustical energy impulses in the liquid when said hydro gun is fired, comprising:

a hollow cylindrical wall defining a cylinder space within said cylindrical wall, said cylindrical wall having first and second ends, said cylinder space being closed at said second end of said cylindrical wall by a lower end wall connected to said cylindrical wall at said second end, said cylinder space being closed at said first end of said cylindrical wall by chamber means connected to said cylindrical wall at said first end, the region within said cylinder space near said chamber means being the head end of the cylinder, a solenoid valve mounted on said chamber means on the opposite side of said chamber means from said cylindrical wall, said chamber means having a firing chamber therein, pressurized gas supply means for feeding pressurized gas into said firing chamber for charging said firing chamber with pressurized gas, said solenoid valve having at least one inlet port communicating with said firing chamber and having an outlet port, said chamber means having a discharge passage communicating between said outlet port of said solenoid valve and said head end of said cylinder space, a piston freely movably mounted in said cylinder space, said hydro gun having vent passage means communicating with said head end of said cylinder space and adapted to extend to the surface of a body of liquid in which said hydro gun is immersed for venting expanded pressurized gas from said cylinder space and for enabling ambient pressure of the liquid to move said piston to an initial position in the head end of said cylinder space near said chamber means, discharge port means in said cylindrical wall located near said lower end wall for permitting the entry of liquid into and the expulsion of the liquid from said cylinder space, seal means carried by said piston in sliding contact with said cylindrical wall for preventing pressurized gas from being exhausted through said discharge port means and to prevent liquid from entering said cylinder space between said piston and said chamber means, and means for actuating said solenoid valve for suddenly releasing the pressurized gas charge from said firing chamber into said head end of said cylinder space for rapidly driving said piston toward said lower end wall for expelling liquid from said cylinder space through said discharge port means for generating acoustical energy impulses when the expelled water is abruptly cut off by said piston blocking said discharge port means.

11. The hydro gun claimed in claim 10, in which:
said discharge passage communicates with said head end of said cylinder space at a position on the axis of said cylinder space; and
said firing chamber is annular in configuration and is encircling said discharge passage and is positioned immediately adjacent to said inlet port of said solenoid valve for enabling said annular firing chamber to be discharged suddenly upon actuation of said solenoid valve.

12. The hydro gun as claimed in claim 11, in which:
said chamber means defines a cavity at the head end of said cylinder space and said cavity faces into said cylinder space and is concentric with the axis of said cylinder space;
said discharge passage communicates with said cavity;
said piston has a protuberance thereon on the end thereof facing said chamber means; and
said protuberance enters into said cavity when said piston is in said initial position.

13. The hydro gun as claimed in claim 12, in which:
said cavity in said chamber block means has a conical surface sloping at an angle A of about 60° to the axis of said cylinder space;
said conical surface has an apex; and
said discharge passage communicates with the apex of said conical surface.

14. The hydro gun as claimed in claim 11, in which:
said pressurized gas supply means includes a flow-restricting orifice positioned near said annular firing chamber through which pressurized gas flows during charging of said annular firing chamber; and
said flow-rstricting orifice essentially limits the amount of pressurized gas which is discharged into the head end of said cylinder during firing of said hydro gun to the amount of pressurized gas charged into said annular firing chamber plus of pressurized gas released by the solenoid valve itself during firing.

* * * * *